United States Patent [19]

Mauz

[11] Patent Number: 5,722,673
[45] Date of Patent: Mar. 3, 1998

[54] INDEPENDENT WHEEL SUSPENSION FOR MOTOR VEHICLES

[75] Inventor: Uwe Mauz, Esslingen, Germany

[73] Assignee: Mercedes-Benz AG, Germany

[21] Appl. No.: 817,819

[22] Filed: Jan. 8, 1992

[30] Foreign Application Priority Data

Jan. 8, 1991 [DE] Germany ............ 41 00 295.4

[51] Int. Cl.$^6$ ........................................... B62D 7/00
[52] U.S. Cl. ........................................ 280/96.1; 280/674
[58] Field of Search ......................... 280/674, 96.1, 280/691, 696

[56] References Cited

U.S. PATENT DOCUMENTS

| | | | |
|---|---|---|---|
| 2,305,795 | 12/1942 | Schieferstein | 280/96.1 |
| 2,752,178 | 6/1956 | Hoffman | |
| 2,846,234 | 8/1958 | Steinkamp et al. | 280/696 |
| 2,998,262 | 8/1961 | Hoffman | 280/96.1 |
| 3,139,275 | 6/1964 | Burkitt | 280/667 |
| 4,026,578 | 5/1977 | Mattson | |
| 4,377,298 | 3/1983 | Finn et al. | 280/696 |
| 4,400,008 | 8/1983 | Rumpel | 280/666 |

FOREIGN PATENT DOCUMENTS

| | | |
|---|---|---|
| 0 083 235 | 7/1983 | European Pat. Off. . |
| 0 401 547 | 12/1990 | European Pat. Off. . |
| 1224166 | 9/1966 | Germany . |
| 2446417 | 4/1976 | Germany . |
| 658387 | 9/1949 | United Kingdom . |
| 1152095 | 1/1968 | United Kingdom . |

OTHER PUBLICATIONS

Abstract of Japanese Publication No. 53-102530, Jun. 9, 1978.

*Primary Examiner*—Paul N. Dickson
*Attorney, Agent, or Firm*—Evenson McKeown, Edwards & Lenahan, P.L.L.C.

[57] ABSTRACT

An independent wheel suspension, having a lower semi-trailing arm comprising a control arm extending in the transverse direction of the vehicle and a control arm which extends toward the rear, diagonally to the longitudinal center plane of the vehicle, from the wheel-side end of the first control arm. The semi-trailing arm, with its outer arm end engages in a vehicle wheel and, by way of a ball joint, is supported on the wheel carrier. On an arm which is fixed to the wheel carrier, a moment supporting arm is pivotally connected which extends in the transverse direction of the vehicle. The semi-trailing arm and the moment support arm are placed essentially in a common horizontal plane, the outer end of the semi-trailing arm, which is supported on the ball joint, is offset diagonally upwards on the outside, and the ball joint is arranged close to the inner circumference of the wheel.

6 Claims, 5 Drawing Sheets

INDEPENDENT WHEEL SUSPENSION FOR MOTOR VEHICLES

BACKGROUND AND SUMMARY OF THE INVENTION

This invention relates to an independent wheel suspension for motor vehicles of the type known as a front-axle suspension.

German Patent Document DE-AS 12 24 1 66 discloses a vehicle suspension system of this type, in which the moment supporting arm lever forms a tie rod which is pivotally connected to a steering arm of the wheel carrier, and which is pivotally connected at its inner end to a steering gear housing of a rack and pinion steering system arranged so that it can be moved in the transverse direction of the vehicle. The outer and inner pivotal connections of the tie rod are situated essentially at the level of the wheel spin axis. The control arm of the semi-trailing armextending in the transverse direction of the vehicle is supported on the ball joint, sloping slightly toward the outside of the vehicle.

Although the arrangement of the semi-trailing arm under the vehicle body floor, below the level of the wheel spin axis, permits its arrangement to be relatively low, due to the positioning of the tie rod above the semi-trailing arm, this wheel suspension is not suitable for maintaining the vehicle floor at a correspondingly low level which is also between the wheels of a vehicle axle equipped with such wheel suspensions, because the rack and pinion steering system and the tie rod are housed in a floor tunnel which extends in the transverse direction of the vehicle, above the level over the vehicle body floor and open in the downward direction.

The ball joint, which supports the semi-trailing arm toward the outside, is fastened to the lower end of the shock absorber of a shock absorber strut. In this case, the ball joint is still situated relatively far above the wheel contact level.

It is therefore an object of the invention to provide a wheel suspension system which permits a particularly low arrangement of the vehicle floor above the axle with a correspondingly low entrance height.

According to the invention, this object is achieved by arranging the semi-trailing arm and the tire rod section substantially common horizontal plane, with the outer end of the semi-trailing arm being angled diagonally upward toward the outside and supported at its outer end on a ball joint arranged close to the inner circumference of the wheel.

According to the invention, the offsetting of the exterior end of the lower semi-trailing arm in this manner, in connection with the low positioning of the ball joint in the wheel interior and the mutual assignment of the semi-trailing arm and the tie rod section, permit a particularly low level of the vehicle bottom. Another advantage of the invention is the fact that, as a result of the low position of the steering arm, its moving curve makes possible a clearance for the housing of an air spring.

The wheel suspension according to the invention is therefore particularly suitable for buses, particularly low-floor buses, in that it permits a low passage height for the center gangway above the axles.

A further embodiment of the invention offers the advantage of moving the pivot point of the ball joint close to the wheel center plane, so that overturning moments applied to the wheel carrier, and disturbing levers resulting from braking and acceleration operations, are kept to a minimum.

Another embodiment oft he invention offers the advantage of manufacturing the supporting Joint and the wheel-carrier-side connecting part of a single component.

Another constructive simplification of the wheel suspension is achieved in still another embodiment, in which the supporting member (which also forms the connecting part) at the same time constitutes a component of the ball joint in that the ball socket is molded into it.

Finally, yet another embodiment of the invention makes it possible to minimize the bending moments applied to the receiving journal of the spherical part in response to lateral forces.

In the case of a forward or rearward steering axle, the wheel carriers of the wheel suspensions can be pivoted about an inclination axis defined by the guiding joint and a suspension joint of the upper suspension link. Thus, the supporting member and the connecting part form a steering arm pivotally connected to a tie rod of a steering device.

Other objects, advantages and novel features of the present invention will become apparent from the following detailed description of the invention when considered in conjunction with the accompanying drawings.

DETAILED DESCRIPTION OF THE DRAWINGS

Figure 2:
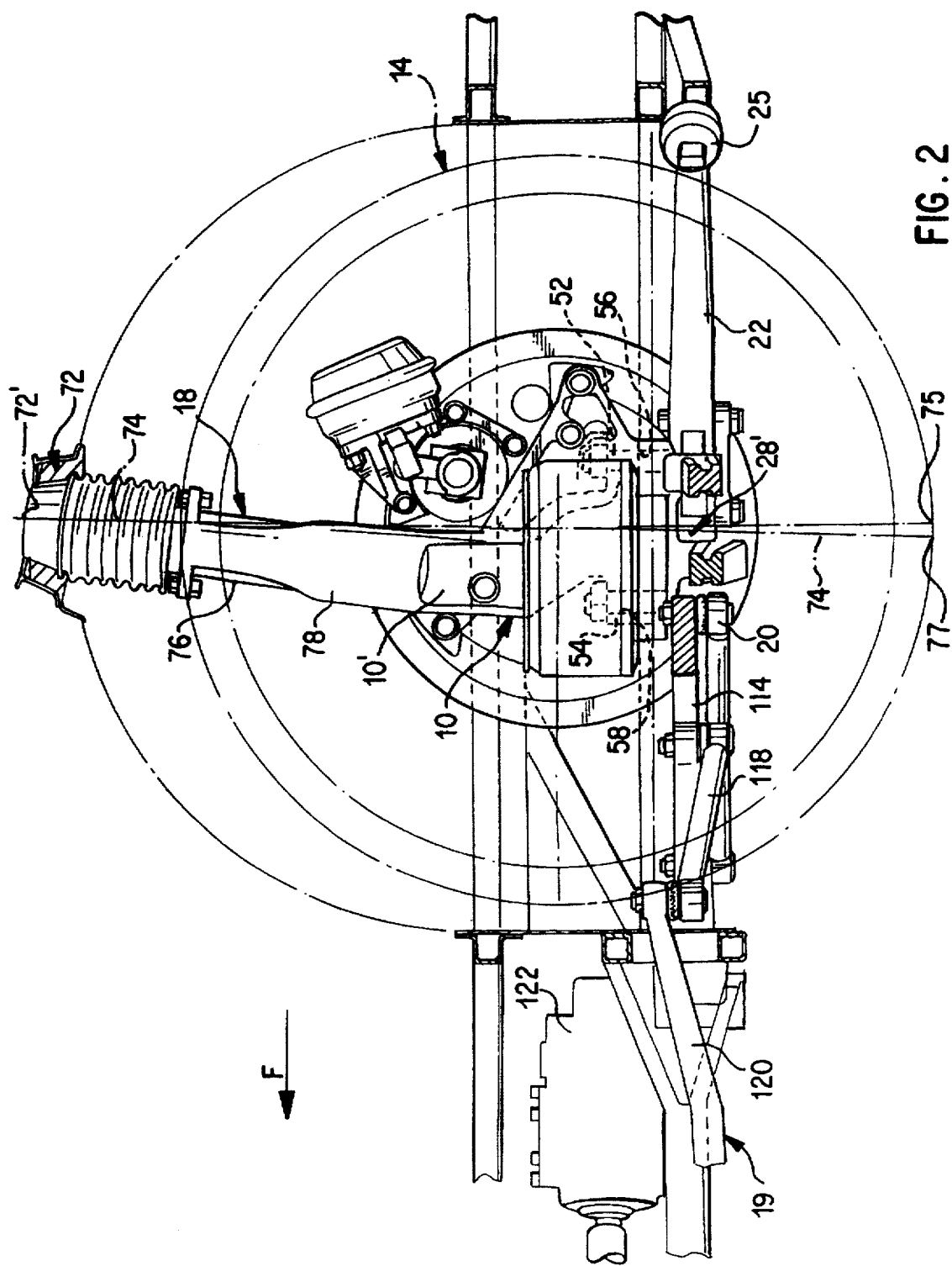
FIG. 2 is a sectional view of the steering axle along Line II—II of FIG. 1.

The illustrated steering axle has two independent wheel suspensions which correspond to one another (only one of which is shown). This one suspension comprises a wheel carrier 10, with a journal 12 on which a wheel 14 is rotatably disposed. The wheel carrier 10 is guided by means of a lower semi-trailing arm 16, an upper suspension link (which is, for example, constructed as a shock absorber strut 18) and a steering device 19 (FIG. 2, 3).

The semi-trailing arm 16 is comprised of a control arm 20 (which preferably extends beyond the longitudinal center plane a—a of the vehicle forming a transverse link) and by a control arm 22, which is rigidly connected with control arm 20 and, forms a longitudinal link. When viewed in the top view and relative to the driving direction F, control arm 22 is situated behind the wheel spin axis 24 and extends diagonally toward the front and outside and, in the design condition, essentially horizontally. (See FIG. 3.) The control arm 20, starting from its connecting point at control arm 22, is situated forward of the wheel spin axis 24, relative to the driving direction F. Accordingly, the corresponding control arm for the opposite wheel suspension is provided behind the wheel spin axis 24.

The bearings 23 and 25 of the two control arms 20 and 22 which are fixed to the vehicle body, because of a correspondingly selected control arm length and a corresponding control arm fitting, define a semi-trailing arm swivelling axis 26 which, viewed in the top view (FIG. 3) and relative to the driving direction F, is situated behind the wheel spin axis 24 and extends diagonally from the inside toward the rear outside. Swivel axis 26 takes up a diagonal position of between 35° and 60°, preferably 5020 , with respect to the longitudinal center plane a—a of the vehicle.

In this manner, a correspondingly wide supporting base is created for the semi-trailing arm 16 on the vehicle body side, so that, as a result of the design length of the two control arms 20 and 22 and of the fitting of the semi-trailing arm 16 into the steering axle, axle kinematics are achieved which, among others, minimize camber changes due to compressions and rebounds.

Figure 5:
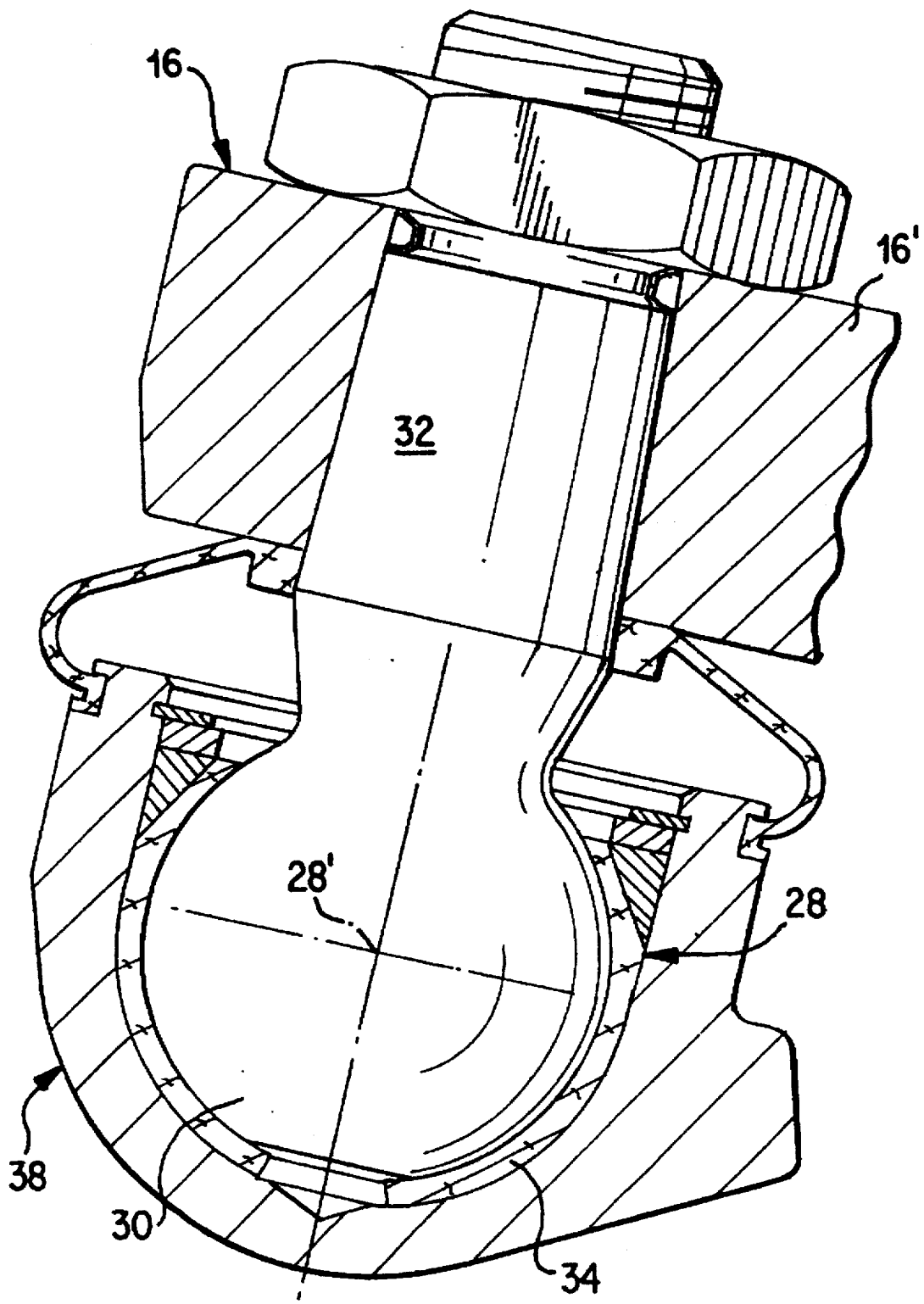
FIG. 5 is a sectional view along Line V—V of FIG. 4.

The pivotal connection of the semi-trailing arm 16 on the wheel carrier 10 is achieved by means of a suspended supporting joint 28 (FIG. 5) which forms a ball joint. Its spherical part 30 is disposed on a preferably conical journal 32 which, in turn, is held in the wheel-carrier-side end piece 16'thereof with the spherical part 30 on the bottom side of the semi-trailing arm 16.

A ball socket 34, which receives the spherical part 30, is provided, preferably by molding, in an end piece of a supporting member 38 fastened to the bottom side of the wheel carrier 10 inside the wheel rim 36. The ball socket 34, is situated between two upper steering arm frontal areas 40 and 42 provided in the same plane. When the supporting joint 28 is mounted, its journal 32 is directed at an acute angle upwards and inwards relative to the plane of steering arm frontal areas 40, 42, in the transverse direction of the vehicle. (See FIG. 5.)

The frontal areas 40 and 42 each form an upper front face of a fastening lug 44 and 46 molded to the supporting member 38 which, in each case, is penetrated by a longitudinal bore 48 and 50.

Figure 6:
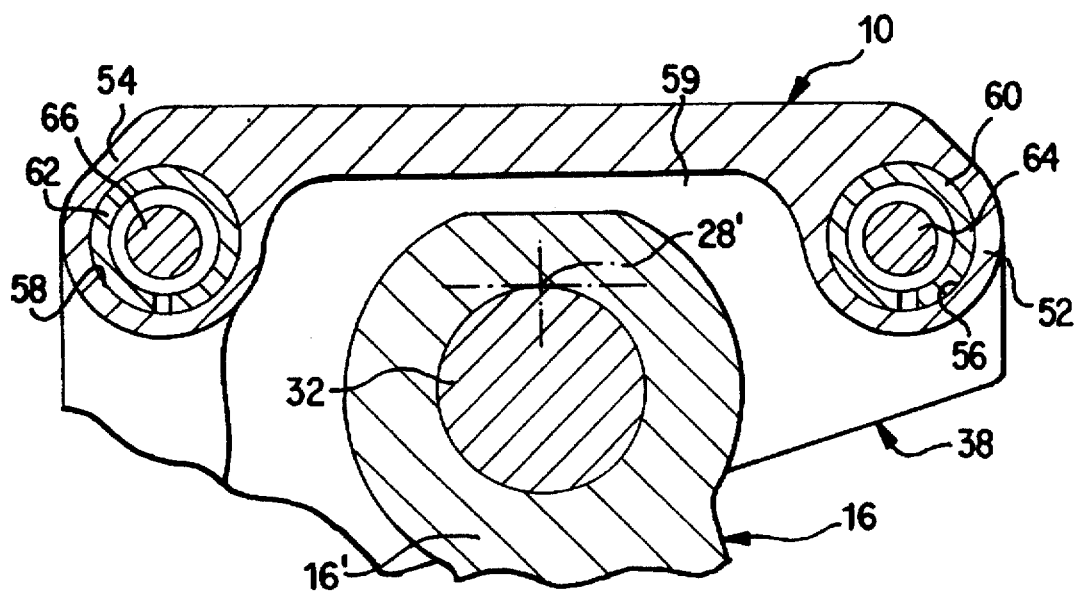
FIG. 6 is a sectional view along Line VI—VI of FIG. 4.

In an alignment with these bores 48 and 50, lower fastening lugs 52 and 54 of the wheel carrier 10 are also each penetrated by a bore 56 and 58. These fastening lugs 52 and 54 bound an indentation 59 of the wheel carrier 10 which opens upward toward the inside (in the transverse direction of the vehicle) and which partially receives the end piece 16' of the semi-trailing arm 16 which is disposed on the journal 32 of the supporting joint 28. (See FIG. 6.)

Figure 4:
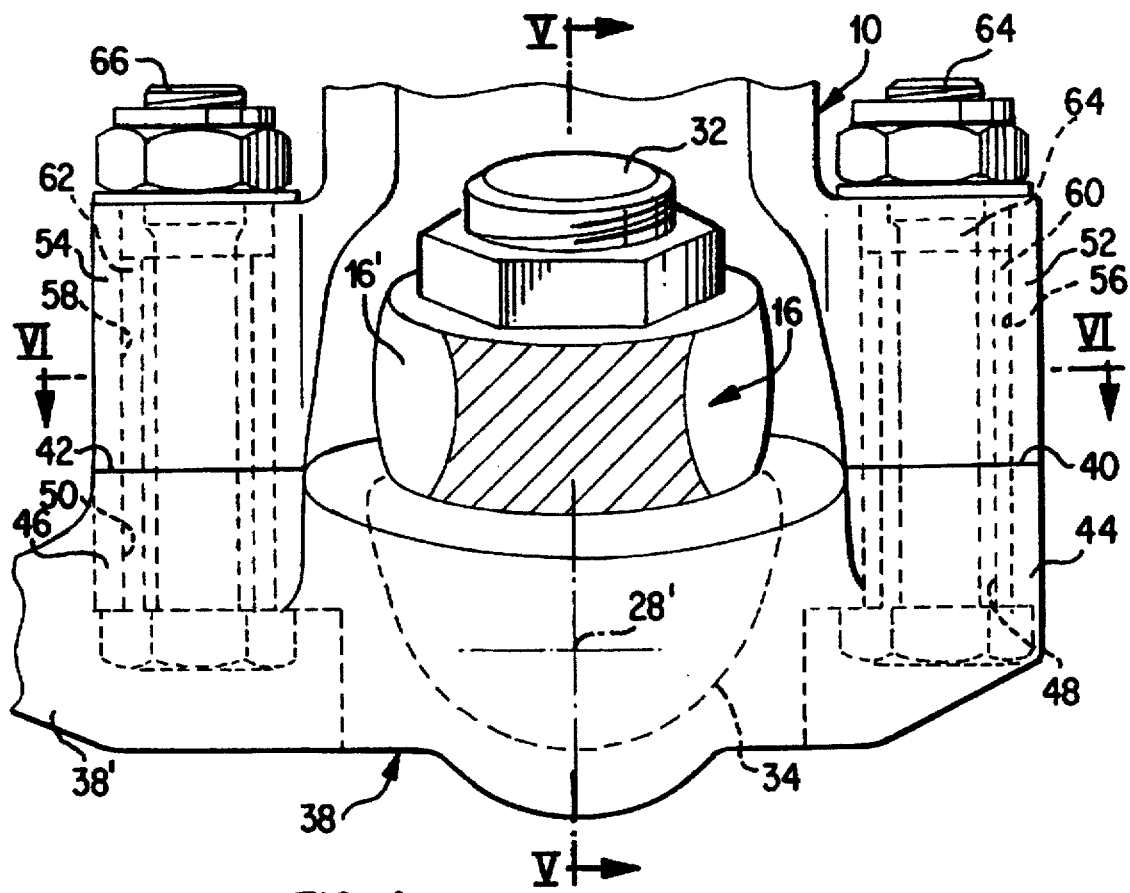
FIG. 4 is a view of the lower part of the wheel carrier viewed in the direction of the arrow C of FIG. 1.

By means of shear bushings 60 and 62 respectively inserted into the bores 48, 50, 56, 58 and the screws 64 and 66 (see FIG. 4), the supporting member 38 is securely fixed to the wheel carrier 10.

A connecting part 38', which projects toward the inside in the transverse direction of the vehicle, extends from the supporting member 38 in the driving direction F. Together, both parts 38 and 38' form a steering arm.

Figure 1:
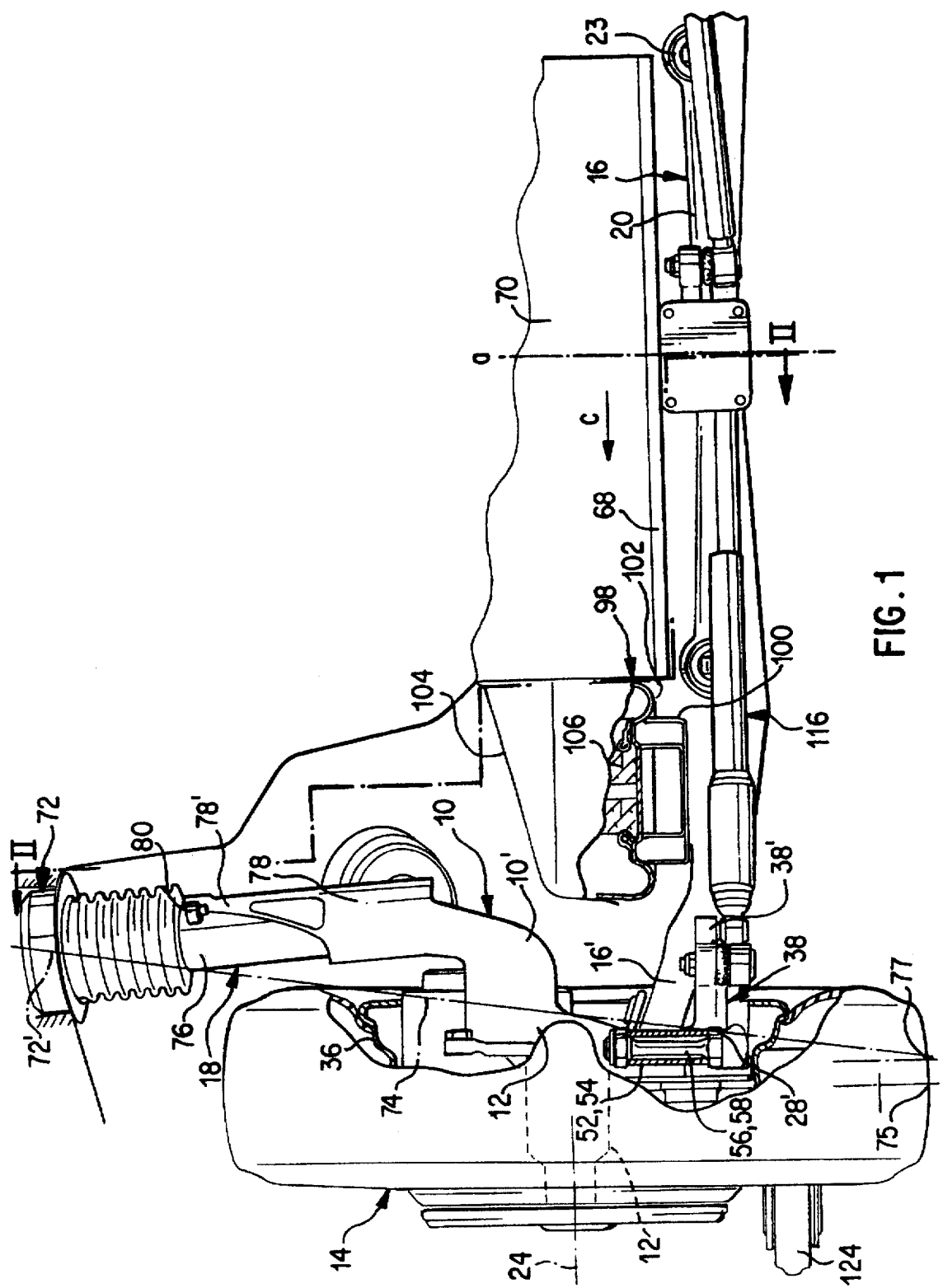
FIG. 1 is a front view of a steering axle for a low-floor bus equipped with independent wheel suspension.

As shown in FIG. 1, pivot point 28' of the supporting joint 28 is situated approximately in the horizontal plane of the control arm 20 of the semi-trailing arm 16, which has the larger length and is directed in the transverse direction of the vehicle. This is achieved by a corresponding offset of the semi-trailing arm end piece 16' diagonally upwards. As a result, it is possible to place the height of a floor 68 (such as a gangway of a bus body extending in the longitudinal center plane a—a) very low above the axles.

As indicated by FIGS. 1 and 2, the shock absorber strut 18 is fitted into the independent wheel suspension preferably in such a manner that it extends from its upper elastic guiding joint 72, which is fixed to the vehicle body, in the transverse direction of the vehicle, diagonally downward toward the inside and, relative to the driving direction F, downward toward the front.

The pivot point 28' of the supporting joint 28 and the pivot point 72' of the guiding joint 72 of the shock absorber strut 18 define a steering axis 74, which, due to its inclination, results in both a positive kingpin offset and (viewed in the driving direction F), a track point 77 which is situated in front of the wheel contact point 75 (FIG. 2), and thus in a positive caster.

The lower end piece of the cylindrical pipe 76 of the shock absorber strut 18 ends at a substantial distance above the semi-trailing arm end piece 16' (FIG. 1) and, for this purpose, is held in an upwardly directed neck 78 which is held by a wheel carrier projection 10' extending above the control amend piece 16' in the transverse direction of the vehicle.

Even in the event of spring movements of the wheel 14, the semi-trailing arm arrangement ensures an extensive constancy of the inclination. Moreover, the bending stress of the cylindrical pipe 76 of the shock absorber strut from bending moments resulting from lateral and longitudinal forces is reduced by the fact that a supporting element in the form of a neck extension 78' is provided which partially reaches around the cylindrical pipe 76 along a portion of its length.

In order to provide a sufficient clearance fort he wheel 14 during compression, the neck extension 78' is preferably supported on the circumferential pipe part facing the longitudinal center plane a—a of the vehicle. For generating the required reaction force, on this supporting side, a screwed connection 80 with the tube jacket is provided on the free end of the neck extension 78'.

Positioning the lower support of the shock absorber strut 18 at a point far above the offset semi-trailing arm end piece 16' offers the advantage of being able to provide an air spring 98 inside the independent wheel suspension in the area close to the wheel. Supporting piston 100 of the air spring is supported on the semi-trailing arm 16 and its air bellows 102 is fixed to the vehicle body by means of a cover plate on a console 104.

This air spring arrangement, which makes it possible to design the gangway 70 of the bus body correspondingly wide, permits a favorable transmission ratio for the air spring 98. It also facilitates a dimensioning of its air bellows 102 which obviates the need for a helper spring in the form of a steel coil spring or, for example, a glass fiber reinforced plastic spring as a transverse leaf spring.

A buffer integrated into the air bellows 102, for a progressive course of the characteristic curves according to a predetermined compression path, has the reference number 106.

Figure 3:
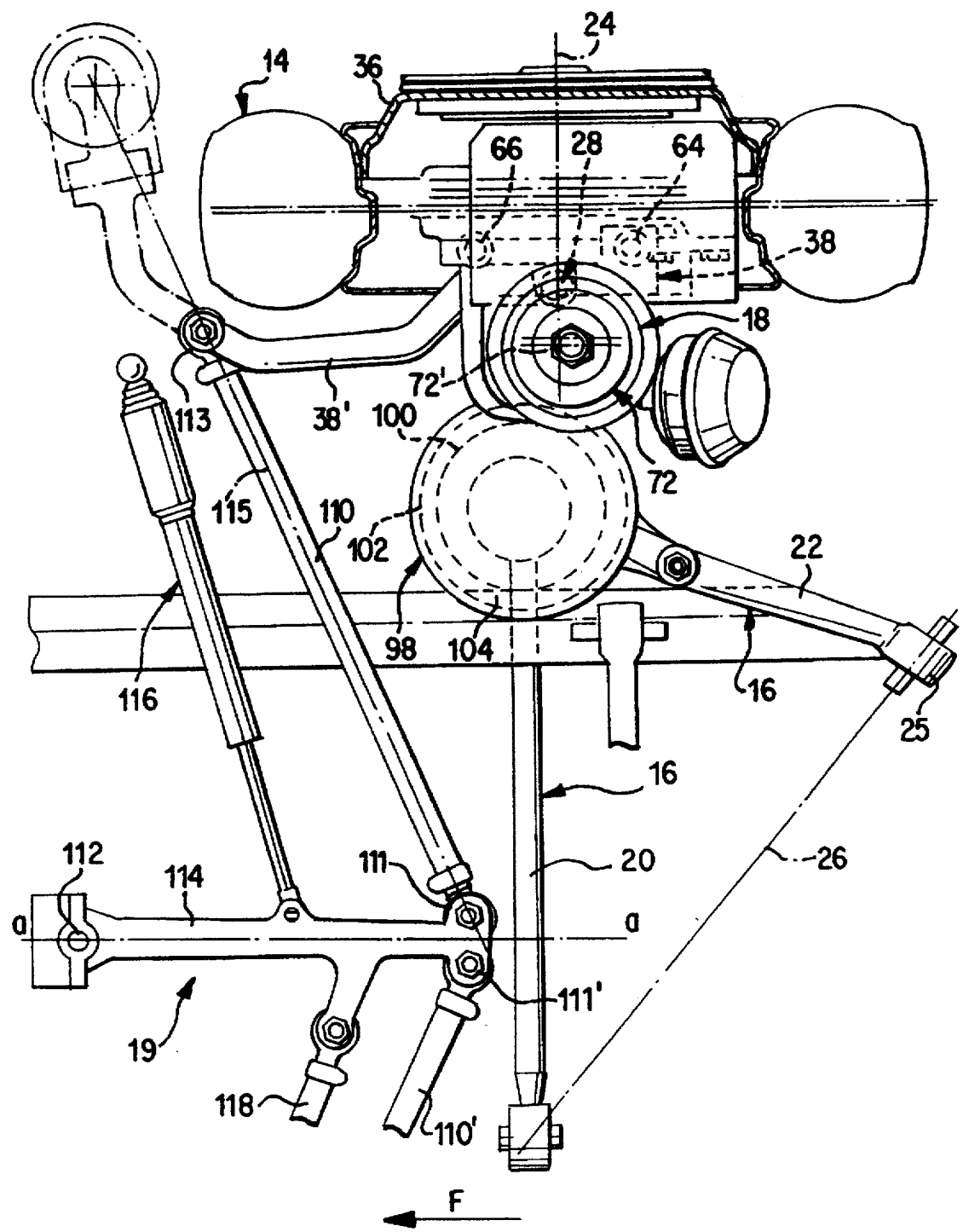
FIG. 3 is a top view of the representation according to FIG. 2.

As indicated in FIG. 3, the steering arm 38, 38', extends in front of the wheel spin axis 24 (relative to the driving direction F), out of the wheel rim 36 and essentially horizontally in the driving direction F. At its free end, a tie rod section 110 of, for example, a two-part tie rod, is pivotally connected with its one end. The other end of the tie rod section is pivotally connected to an intermediate steering arm 114 which can be pivoted about a vertical axis 112 in the longitudinal center plane a—a of the vehicle. Another tie rod section 110' also extends from the intermediate steering arm 114 in the direction of the other independent wheel suspension.

The inner joint 111 and 111' of both tie rod sections 110, 110' on the intermediate steering arm 114 is situated at a much smaller distance from the transverse plane of the vehicle containing the wheel spin axis 24 than the steering arm-side joint 113.

A steering shock absorber 116 is pivotally connected to the intermediate steering arm 114; while a steering rod 118 which can be adjusted by means of a pitman arm 120 (FIG. 2) of a steering gear 122.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. An independent wheel suspension for motor vehicles, comprising:
   - a semi-trailing arm arranged below a vehicle body floor of said vehicle and below a level of a wheel spin axis thereof, said semi-trailing arm comprising a first control arm extending in the transverse direction of the vehicle and having an inner end which is elastically pivotally connected in the area of a longitudinal center plane of the vehicle, and a second control arm extending from an outward end area of the first control arm toward a rear end of said vehicle, diagonally to the longitudinal center plane of said vehicle;
   - a vehicle wheel disposed on a wheel carrier, with an exterior end of said semi-trailing arm being supported in a ball joint on the wheel carrier; and
   - a tie rod section which is pivotally connected to a steering arm fixed to the wheel carrier and extends in the transverse direction of the vehicle;
   - wherein the semi-trailing arm and the tie rod section are disposed approximately in a common horizontal plane, with said ball joint being arranged on said wheel carrier close to an inner circumference of said wheel;
   - wherein the exterior end of the semi-trailing arm, which is supported on said ball joint, is bent diagonally upward and offset toward outside of the vehicle;
   - wherein said exterior end of the semi-trailing arm engages in an indentation of the wheel carrier which opens in the direction of an interior side of the vehicle and which is closed off in a downward direction by means of a supporting member which is fastened to the wheel carrier and supports the ball joint;
   - wherein the supporting member is an integral part of the steering arm; and
   - wherein a ball part of said ball joint extends from a bottom side of the semi-trailing arm and engages in a socket which is disposed on the steering arm.

2. A wheel suspension according to claim 1 wherein the tie rod section is pivotally connected to a connecting part projecting toward the inside from the supporting member in the transverse direction of the vehicle.

3. A wheel suspension according to claim 1, wherein the supporting member has two horizontal frontal surfaces which are arranged at a distance from one another in the longitudinal direction of the vehicle and are parallel to one another, and the wheel carrier has counterfaces assigned to said frontal surfaces, which surfaces are penetrated in the vertical direction by mutually aligned screw bores, and wherein a ball socket of the ball joint is molded in on a top side of the supporting member in the center between the frontal surfaces.

4. A wheel suspension according to claim 2, wherein the supporting member has two horizontal frontal surfaces which are arranged at a distance from one another in the longitudinal direction of the vehicle and are parallel to one another, and the wheel carrier has counterfaces assigned to said frontal surfaces, which surfaces are penetrated in the vertical direction by mutually aligned screw bores, and wherein a ball socket of the ball joint is molded in on a top side of supporting member in the center between the frontal surfaces.

5. A wheel suspension according to claim 1, wherein an axis of a receiving journal of a spherical part of the ball joint, viewed in the longitudinal direction of the vehicle, extends diagonally upward to the inside.

6. A wheel suspension according to claim 1, wherein the vehicle wheel has a wheel rim and the ball joint is arranged on the wheel carrier inside the wheel rim.

* * * * *